May 28, 1968    R. W. COUFFER, JR    3,385,316
SNAP ACTING WATER VALVE
Filed June 22, 1965
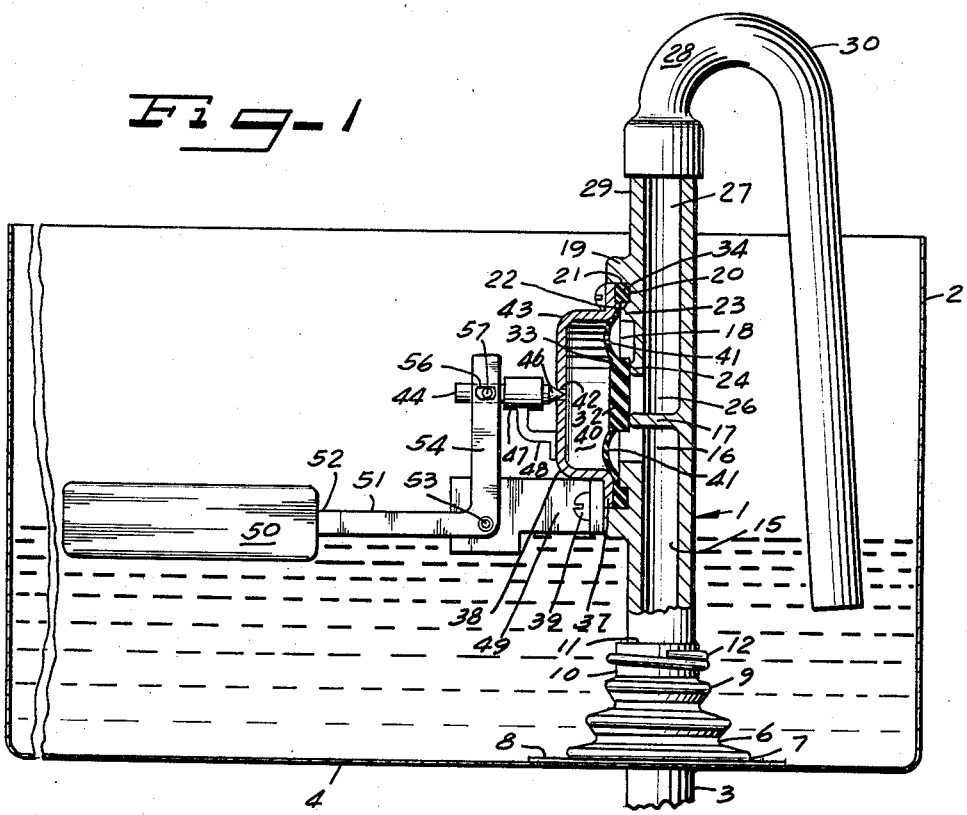
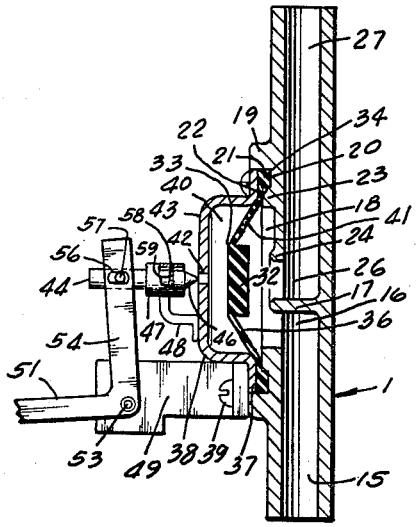
INVENTOR.
ROBERT W. COUFFER JR.
BY  Hill, Sherman, Meroni, Gross & Simpson
ATTORNEYS

United States Patent Office 3,385,316
Patented May 28, 1968

3,385,316
SNAP ACTING WATER VALVE
Robert W. Couffer, Jr., Deerfield, Ill., assignor to The Dole Valve Company, Morton Grove, Ill., a corporation of Illinois
Filed June 22, 1965, Ser. No. 465,963
1 Claim. (Cl. 137—414)

ABSTRACT OF THE DISCLOSURE

A flow regulator for controlling the level of fluid within a reservoir which includes a snap acting valve which is opened and closed by changing pressure differentials across a resilient snap acting diaphragm. The snap acting diaphragm is actuated by a movable pin which is positioned within a relief port of the valve. The pin is moved to and fro within a guide by means of a float member, a linkage, and a lost motion connection. Means are provided within the guide member to retard the motion of the pin to enable the pin to resist the fluid pressure exerted at the interior of the valve during operation of the lost motion connection.

---

This invention relates to a snap acting water valve utilizing a novel fluid pressure actuated diaphragm valve and a fluid level sensitive valve for providing a rapidly responsive water level control device. In particular this invention relates to a pressure actuated diaphragm valve having a pilot or pressure relief valve actuated by a float mechanism.

Increasing demands for household humidifiers have produced corresponding needs for improvements in various operational aspects of these devices; this invention is directed to such a need.

A principal requirement of a household humidifier is the maintenance of a suitable reservoir from which water can be subsequently drawn and delivered to a vaporizing mechanism.

Presently, household humidifiers which have an "automatic refill provision" employ a sliding-type valve for controlling the flow through a main water inlet, the valve being actuated by a float mechanism suspended by a water supply the level of which is to be regulated. But this type of valve has several important disadvantages which become accentuated when encountered in a humidifier control.

One failing of such a valve derives from the fact that the water level in the reservoir of a humidifier declines slowly and steadily rather than abruptly and only occasionally. The result is that the pressurized inlet is caused to open at an undesirable slow rate which in turn means an extended period during which spurting and other noisy features associated with a partially opened valve must be tolerated. Also the time required to replenish the water supply is extended over that which would be expected from an immediately fully-opened valve, and to that degree the aggravating circumstance of continuously running water is experienced.

Further disadvantages have been uncovered for humidifiers utilizing the slow moving reservoir control as described. For example, the steady flow of water associated with a humidifier results in a gradual build-up of mineral deposits on the valve head and seat. This program is particularly emphasized in hard water regions.

Also the frequent opening and closing of a humidifier valve may cause an operational fatigue resulting in a shearing of the valve head commonly known as "wire drawing."

Both the build-up of mineral deposits and the process of "wire drawing" at the valve head result in a failure of the water inlet to close tightly causing additional spurting, noise and leakage problems.

Therefore, it is an object of this invention to provide a level sensitive water valve for quickly opening and closing a pressurized inlet.

It is a further object of this invention to provide a water valve which has the capacity to respond quickly to a slow moving actuator.

Additional features, objects and advantages of this invention will be understood from the following description and the associated drawings in which an exemplification of the invention is shown.

On the drawings:

FIGURE 1 is a partially cross-sectioned view of the water valve according to this invention as found in its operational environment; and FIGURE 2 is a cross-sectioned view of the valve assembly of FIGURE 1 showing the various parts in a different operating position from that shown in FIGURE 1.

As shown on the drawings:

Reference numeral 1 designates generally a snap acting water valve assembly according to this invention. The assembly 1 is suitably mounted for operation within a water tank 2 constituting a reservoir of a household humidifier.

The assembly 1 has an inlet fitting 3 extending through a lower wall 4 of the tank 2 and this fitting, in turn, is connected to a normal household source of pressurized water.

A rubber boot 6 forms a water tight seal at a junction 7 with a fabricating plate 8. The plate 8 is seam-welded to the lower wall 4 of the tank 2.

The boot 6 has accordion-like ridges 9 for increased flexibility and a seal collar 10. The collar 10 receives the inlet fitting 3 and forms a water tight junction 11 by virtue of the ring clamp 12. Use of the boot 6 furnishes the tank 2 with a leakproof means for allowing the easy removal of the valve assembly 1 such as for repairs or replacement.

The inlet 3 opens to an initially vertical passageway 15 which is constrained into a right angle path 16 by a horizontally generated flange 17.

The right angle path 16 expands into an annular chamber 18 formed within a horizontally protruding cylindrical boss 19 of the valve 1. The boss 19 has an inwardly disposed annular groove 20 defined by an inner wall 21 of the boss 19 and an outer wall 22 of a concentrically inwardly disposed ridge 23.

The innermost concentric rim 24 (formed in conjunction with the horizontally extending flange 17) and the ridge 23 cooperate to determine the inner and outer limits of the annular chamber 18.

The rim 24 defines a principal outlet 26. The outlet 26 conducts through an upper passageway member 27 axially aligned with lower passageway 15. A rubber tubing 28 is force-fitted over the extremity 29 of the member 27 and makes a reverse turn 30 for returning the flow downward into the tank 2. The open end of the tubing 28 is directed below the water level 31 and acts as a flow silencer thereby.

The principal function of the concentric rim 24 is to act as a valve seat for a resilient boss 32 of a pressure actuated diaphragm 33. The diaphragm 33 has an outermost circular lip 34 complementarily fitted within the inwardly disposed annular groove 20. A thin walled ring portion 36 of the diaphragm 33 bows outwardly of chamber 18 and is formed integrally with lip 34 and boss 32.

The outer lip 34 of the diaphragm 33 is caused to form a water tight bond within the annular groove 20 by virtue of an outwardly flared edge 37 of a cap 38 which is secured to the boss 19 by a plurality of screws 39.

The cap 38 in conjunction with the diaphragm 33 defines a pilot chamber 40. A bleed port 41 formed within the thin walled portion 36 of the diaphragm 33 connects the chambers 40 and 18 at the vicinity of the right angle path 16 of the inlet passageway 15. It will be understood, however, that the port 41 might be positioned at any convenient point radially outwardly spaced from the outlet 26.

The pilot chamber 40 has a relief port 42 formed within a front wall 43 of the cap 38, which has a flow area greater than that of the port 41.

A valve stem 44 has a tapered head 46 cooperable for closing the relief port 42. The stem 44 is slidably supported by a cylindrical guide 47 which is in turn affixed to the cap 38 by a right angle bracket 48.

A float mounting bracket 49 is secured to the boss 19 by one of the plurality of screws 39. A float 50 has a right angle linkage 51 fixedly secured at a point 52 and pivotally mounted on the bracket 49 by a pin 53. A vertical leg 54 of the linkage 51 has a transverse slot 56 engaged with a pin 57 suitably secured to the valve stem 44.

In operation the float 50, being supported by the water level 31, serves to open and close the valve stem 44 by virtue of its pivoted position about the pin 53. As the water level recedes, due to consumption by the vaporizer section of the humidifier, the float lowers and carries the vertical leg 54 of the right angle linkage 51 into engagement with the pin 57 for removing the tapered head 46 from the relief port 42. As the water level rises, this action is reversed and the tapered head 46 is moved for closing the port 42.

It should be noted that as the float 50 falls due to a declining water level, the outermost edge of the elongated slot 56 will move outwardly from the port 42 for releasing the inward pressure on the pin 57. Were the valve stem 44 received loosely within the sleeves 47, the water pressure within the pilot chamber 40 would force the tapered head 46 out of engagement with the relief port 42 for actuating the water valve comprising the diaphragm 33 and the outlet 26. This would mean the slightest decline in water level would start the refill process which, of course, is a highly undesirable result.

To avoid this oversensitivity of the float mechanism, a friction ring 58 is provided intermediate the valve stem 44 and the sleeve 47. The ring 58, which may be a standard O ring or the like, is fitted within a groove 59 formed at the outer surface of the stem 44. In this way the longitudinal position of the ring is maintained within the region encompassed by the sleeve 47.

The resulting friction developed by the ring 58 is provided to be sufficient to overcome the oppositely directed force associated with the water pressure acting at the tapered head 46. Therefore, in the absence of an external force as may be applied by the weight of the float 50, the stem 44 will retain its closed position with the port 42.

The net effect of the friction ring 58 in conjunction with the elongated slot 56 is that the decline in water level will not actuate the refill cycle until the innermost edge of the slot 56 contacts the pin 57 and forces the valve stem 44 in a direction for opening the relief port 42. Therefore a substantial decline in the outer level is permitted before the system is actuated and the refill mechanism is to that degree employed more efficiently.

The pressure differential for maintaining the diaphragm boss 32 in a seated port-closing position exists because pressurized water is communicated to the chamber 40 from the chamber 18 and acts across a greater surface area on the left hand side of the diaphragm than it does on the right hand side.

Referring to FIGURE 2, it can be observed that opening the relief port 42 (accomplished by a receding water level) results in a loss of pressure within the chamber 40. This loss of pressure is due to the design feature of having the relief port 42 purposely larger than the bleed port 41. This allows the chamber 40 to be vented faster than it can be pressurized resulting in a pressure differential across the diaphragm tending to unseat the diaphragm boss 32.

Opening the outlet 26 then permits the free flow of water from the inlet passageway 15, around the horizontally extending flange 17, through the upper vertical passageway 27 and the rubber tubing 28 for restoring the water level 31 as shown in FIGURE 1.

With the water supply replenished and the relief port 42 closed, a pressure differential again develops across the diaphragm 33 but this time it is directed for closing the outlet 26. Here the net pressure differential is not caused by unequally exposed diaphragm areas but rather by a high speed flow adjacent to the resilient boss 32 and immediately over the outlet port. This vortex creates a low pressure area in the vicinity of the outlet 26 and since water communicated to the chamber 40 is at the pressure of water within the chamber 18 radially outwardly of the passage 26 (resulting from the positioning of the bleed port), a positive pressure differential exists which forces the diaphragm against the rim 24.

Important to the operation of this valve is the fact that the relief port 42 is located within the front wall 43 of the cap 38 rather than within the resilient boss 32. This unique positioning allows the snap-like motion of the diaphragm 33 to be unimpeded by the presence of the valve stem 44.

The valve stem 44 is necessarily withdrawn slowly, as its speed is determined by the rate of water decline within the tank 2. Were the relief port 42 formed within the resilient boss 32, noisy oscillations would be established between the slowly withdrawing valve stem 44 and the diaphragm 33.

That these oscillations would be realized can be seen from the fact that as soon as a valve head were withdrawn from a relief port formed directly within the diaphragm boss, the diaphragm would be quickly forced open as indicated above. However, in so opening, the rapidly moving diaphragm would again engage the slowly retreating valve head, close the relief port, and establish a pressure differential for setting the diaphragm back into a closing motion. These vibrations would then continue until the valve stem were withdrawn beyond the reach of successive reengagements by the moving diaphragm.

The present invention overcomes this obstacle and has provided a fast action diaphragm capable of being actuated by a slow moving control valve.

It will be understood that various modifications may be suggested by the embodiment disclosed, but I desire to claim within the scope of the patent warranted hereon all such modifications as come within the scope of my invention.

What I claim is:

1. A water level control assembly for controlling the level of water within a reservoir comprising:
    a valve body having an inlet communicable with a source of water under pressure and an outlet communicable with the reservoir,
    an annular chamber communicating with said inlet,
    a seat defining a port formed within said valve body centrally of said chamber and leading from said inlet to said outlet,
    a diaphragm peripherally sealed to said valve body and extending across said chamber and said port and having a solid head portion engageable with said seat to control water flow through the said port,
    a cap extending over said diaphragm on the opposite side thereof from said annular chamber,
    a pressure chamber formed intermediate said cap and said diaphragm,
    a bleed port formed within said diaphragm in a position overlying the said annular chamber and communicating said chambers with one another,
    a relief port formed within said cap and communicating from said pressure chamber to the outside of said valve body and opening to said pressure chamber and having a flow area greater than that of said bleed port, a tapered pin valve member cooperable with said relief port to control water flow therethrough, guide means connected to said cap and embracing said valve member to guide said valve member for rectilinear movement relative to said relief port, a resilient ring fitted about said valve member within said guide member for providing a friction union therewith to oppose motion of said valve member due to water pressure within said pressure chamber, a float riding on the water within the reservoir, a link arm connected to said float and pivotally mounted within said reservoir, and a lost motion connection between said link arm and said valve member, said float, link and lost motion connection holding said valve member closed against fluid pressure within said pressure chamber when said float is raised by a given fluid level within said reservoir, whereby water level controlled movement of said float will control movement of said valve member relative to said relief port and thereby control actuation of said diaphragm and wherein the position of said valve member will be unaffected by a predetermined amount of movement of said float as a result of said lost motion connection.

References Cited

UNITED STATES PATENTS

| | | | |
|---|---|---|---|
| 1,312,678 | 8/1919 | Brien | 137—422 X |
| 1,676,084 | 7/1928 | Flagg | 137—414 |
| 1,839,144 | 12/1931 | Flagg | 137—414 |
| 2,228,552 | 1/1941 | Arbdgast | 137—414 |
| 2,675,024 | 4/1954 | Clark | 251—297 X |
| 2,738,947 | 3/1956 | Hjulian | 137—416 X |
| 2,752,936 | 7/1956 | Cantalupo | 137—414 |
| 3,158,173 | 11/1964 | Bachli et al. | 137—414 |

FOREIGN PATENTS

| | | |
|---|---|---|
| 12,336 | 5/1903 | Great Britain. |

ALAN COHAN, *Primary Examiner.*

D. MATTHEWS, *Assistant Examiner.*